(12) United States Patent
Khen et al.

(10) Patent No.: US 9,317,495 B2
(45) Date of Patent: *Apr. 19, 2016

(54) METHOD, SYSTEM, AND APPARATUS FOR PROVIDING ACCESS TO WORKBOOK MODELS THROUGH REMOTE FUNCTION CALLS

(75) Inventors: Dan Y. Khen, Bellevue, WA (US); Charles D. Ellis, Seattle, WA (US); Liviu Asnash, Redmond, WA (US); Eran Megiddo, Bellevue, WA (US); Ira Levin, Seattle, WA (US); Simon Peyton-Jones, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 117 days.

This patent is subject to a terminal disclaimer.

(21) Appl. No.: 13/620,854

(22) Filed: Sep. 15, 2012

(65) Prior Publication Data

US 2013/0013995 A1    Jan. 10, 2013

Related U.S. Application Data

(63) Continuation of application No. 10/903,781, filed on Jul. 30, 2004, now Pat. No. 8,578,399.

(51) Int. Cl.
*G06F 17/24* (2006.01)
*G06F 9/54* (2006.01)
*H04L 29/06* (2006.01)

(52) U.S. Cl.
CPC ............. *G06F 17/246* (2013.01); *G06F 9/541* (2013.01); *G06F 9/547* (2013.01); *H04L 67/40* (2013.01)

(58) Field of Classification Search
CPC ....... G06F 17/246; G06F 9/541; G06F 9/547; H04L 67/40
See application file for complete search history.

(56) References Cited

U.S. PATENT DOCUMENTS

| 4,912,657 A | 3/1990 | Saxton et al. |
| 5,033,009 A | 7/1991 | Dubnoff |

(Continued)

FOREIGN PATENT DOCUMENTS

| CN | 200510089652.8 | 10/2009 |
| EG | 23841 | 10/2007 |

(Continued)

OTHER PUBLICATIONS

Canadian Office Action dated Nov. 27, 2012 cited in Application No. 2,508,537, 2 pgs.

(Continued)

*Primary Examiner* — Charles E Anya
(74) *Attorney, Agent, or Firm* — Damon Rieth; Tom Wong; Micky Minhas

(57) ABSTRACT

A method, system, and apparatus are provided for exposing and calling workbook models via remote function calls. According to the system, a client computer executes a spreadsheet program for creating a workbook model. The workbook model may be published to a server computer along with data defining a function name and the cells that should be used as inputs and outputs to the model. The system also includes a server computer that receives and responds to remote function calls directed toward workbook functions. When a function call is received at the server computer for a workbook function, the server computer populates the cells in the workbook identified as inputs with input parameters received with the function call and recalculates the workbook. The data contained in the output cells is then returned as a reply to the remote function call.

19 Claims, 8 Drawing Sheets

(56) References Cited

U.S. PATENT DOCUMENTS

| | | | |
|---|---|---|---|
| 5,371,675 A | 12/1994 | Greif et al. | |
| 5,437,006 A | 7/1995 | Turski | |
| 5,721,847 A | 2/1998 | Johnson | |
| 5,724,588 A * | 3/1998 | Hill et al. ..................... | 719/328 |
| 5,832,532 A | 11/1998 | Kennedy et al. | |
| 5,890,174 A | 3/1999 | Khanna et al. | |
| 5,893,123 A | 4/1999 | Tuinenga | |
| 5,926,822 A | 7/1999 | Garman | |
| 5,933,818 A | 8/1999 | Kasravi et al. | |
| 5,937,406 A | 8/1999 | Balabine et al. | |
| 5,966,716 A | 10/1999 | Comer et al. | |
| 5,974,416 A | 10/1999 | Anand et al. | |
| 5,983,268 A | 11/1999 | Freivald et al. | |
| 6,009,455 A | 12/1999 | Doyle | |
| 6,012,057 A | 1/2000 | Mayer et al. | |
| 6,055,548 A | 4/2000 | Comer et al. | |
| 6,094,651 A | 7/2000 | Agrawal et al. | |
| 6,122,649 A | 9/2000 | Kanerva et al. | |
| 6,157,934 A | 12/2000 | Khan et al. | |
| 6,269,377 B1 | 7/2001 | Collie et al. | |
| 6,317,750 B1 | 11/2001 | Tortolani et al. | |
| 6,411,313 B1 | 6/2002 | Conlon et al. | |
| 6,412,020 B1 * | 6/2002 | Leach et al. ................... | 719/316 |
| 6,430,584 B1 | 8/2002 | Comer et al. | |
| 6,446,059 B1 | 9/2002 | Berger et al. | |
| 6,456,999 B1 | 9/2002 | Netz | |
| 6,473,750 B1 | 10/2002 | Petculescu et al. | |
| 6,477,536 B1 | 11/2002 | Pasumansky et al. | |
| 6,490,600 B1 | 12/2002 | McGarry | |
| 6,493,718 B1 | 12/2002 | Petculescu et al. | |
| 6,532,458 B1 | 3/2003 | Chaudhuri et al. | |
| 6,549,907 B1 | 4/2003 | Fayyad et al. | |
| 6,604,135 B1 | 8/2003 | Rogers et al. | |
| 6,613,098 B1 | 9/2003 | Sorge et al. | |
| 6,631,497 B1 | 10/2003 | Jamshidi et al. | |
| 6,632,249 B2 | 10/2003 | Pollock | |
| 6,684,206 B2 | 1/2004 | Chen et al. | |
| 6,691,281 B1 | 2/2004 | Sorge et al. | |
| 6,701,485 B1 | 3/2004 | Igra et al. | |
| 6,748,389 B1 | 6/2004 | Cesare et al. | |
| 6,779,151 B2 | 8/2004 | Cahill et al. | |
| 6,898,603 B1 | 5/2005 | Petculescu et al. | |
| 6,920,443 B1 | 7/2005 | Cesare et al. | |
| 6,944,662 B2 | 9/2005 | Devine et al. | |
| 6,988,241 B1 | 1/2006 | Guttman et al. | |
| 7,013,246 B1 | 3/2006 | Gerlovin et al. | |
| 7,032,030 B1 | 4/2006 | Codignotto | |
| 7,082,569 B2 | 7/2006 | Voshell | |
| 7,177,855 B2 | 2/2007 | Witkowski et al. | |
| 7,185,279 B2 | 2/2007 | Machalek | |
| 7,222,294 B2 | 5/2007 | Coffen et al. | |
| 7,233,956 B2 | 6/2007 | Balducci et al. | |
| 7,240,052 B2 | 7/2007 | Sidlosky et al. | |
| 7,251,776 B2 | 7/2007 | Handsaker et al. | |
| 7,266,763 B2 | 9/2007 | Peyton-Jones et al. | |
| 7,299,223 B2 | 11/2007 | Namait et al. | |
| 7,530,012 B2 | 5/2009 | Medicke et al. | |
| 7,664,804 B2 | 2/2010 | Battagin et al. | |
| 7,761,403 B2 | 7/2010 | Witkowski et al. | |
| 7,991,804 B2 | 8/2011 | Battagin et al. | |
| 8,578,399 B2 | 11/2013 | Khen et al. | |
| 2002/0010743 A1 | 1/2002 | Ryan et al. | |
| 2002/0013786 A1 | 1/2002 | Machalek | |
| 2002/0059261 A1 | 5/2002 | Pollock | |
| 2002/0065849 A1 | 5/2002 | Ferguson et al. | |
| 2002/0095399 A1 | 7/2002 | Devine et al. | |
| 2002/0106040 A1 * | 8/2002 | Malkemes et al. ............ | 375/347 |
| 2002/0118221 A1 * | 8/2002 | Hudson et al. ................ | 345/711 |
| 2002/0129054 A1 * | 9/2002 | Ferguson et al. ............. | 707/503 |
| 2002/0169799 A1 | 11/2002 | Voshell | |
| 2002/0188629 A1 | 12/2002 | Burfoot | |
| 2003/0110191 A1 | 6/2003 | Handsaker et al. | |
| 2003/0149934 A1 | 8/2003 | Worden | |
| 2003/0195762 A1 | 10/2003 | Gleason et al. | |
| 2003/0226105 A1 * | 12/2003 | Waldau ......................... | 715/503 |
| 2004/0060001 A1 | 3/2004 | Coffen et al. | |
| 2004/0103365 A1 | 5/2004 | Cox | |
| 2004/0103366 A1 * | 5/2004 | Peyton-Jones et al. ....... | 715/503 |
| 2004/0133567 A1 | 7/2004 | Witkowski et al. | |
| 2004/0133568 A1 | 7/2004 | Witkowski et al. | |
| 2004/0237029 A1 | 11/2004 | Medicke et al. | |
| 2005/0039113 A1 | 2/2005 | Balducci et al. | |
| 2005/0039114 A1 | 2/2005 | Naimat et al. | |
| 2005/0267853 A1 | 12/2005 | Netz et al. | |
| 2006/0024653 A1 | 2/2006 | Battagin et al. | |
| 2006/0037030 A1 * | 2/2006 | Kovachka-Dimitrova et al. ........................... | 719/328 |
| 2006/0112123 A1 | 5/2006 | Clark | |
| 2006/0200772 A1 * | 9/2006 | Dhanapal ............... G06Q 10/06 | 715/760 |
| 2009/0235154 A1 | 9/2009 | Khen et al. | |

FOREIGN PATENT DOCUMENTS

| | | |
|---|---|---|
| EP | 9 997 834 A1 | 5/2000 |
| EP | 1 605 367 A1 | 12/2005 |
| EP | 1622016 A2 | 2/2006 |
| JP | 07-200449 | 8/1995 |
| JP | 2000-067143 | 3/2000 |
| JP | 2001-243242 | 9/2001 |
| JP | 2002-041309 | 2/2002 |
| JP | 2003-337725 | 11/2003 |
| JP | 2004-046657 | 2/2004 |
| NZ | 540421 | 3/2007 |
| PH | 1-2005-000275 | 7/2010 |
| RU | 2174256 C2 | 9/2001 |
| RU | 2213369 C2 | 9/2003 |
| RU | 2002118306 A | 2/2004 |
| RU | 36 541 U1 | 3/2004 |
| SG | 117588 | 4/2008 |
| ZA | 200504159 (A) | 8/2006 |

OTHER PUBLICATIONS

Indian First Examination Report dated Feb. 4, 2014 cited in Application No. 1281/DEL/2005.

ICanadian Office Action dated Jan. 10, 2014 cited in Application No. 2,508,537, 2 pgs.

"Office Action and Search Report Issued in Canada Patent Application No. 2508537", Mailed Date: May 11, 2015, 5 Pages.

Indian First Examination Report dated Mar. 5, 2014 cited in Application No. 1312/DEL/2005, 2 pgs.

Canadian Office Action dated Oct. 16, 2014 cited in Application No. 2,508,537, 3 pgs.

European Search Report dated Jul. 30, 2007 cited in EP Application No. 05104620.9-1243.

European Official Communication dated Nov. 5, 2007 cited in EP Application No. 05 104 620.9-1243.

U.S. Office Action dated May 23, 2008 cited in U.S. Appl. No. 10/858,175.

European Search Report dated Jun. 23, 2006 cited in Application No. 05104477.4-2201.

Lakshmanan et al., "On Querying Spreadsheets," Data Engineering, 1998, Proceedings, 14th International Conference, pp. 134-141.

De Paoli et al., "Requirements for a Layered Software Architecture Supporting Cooperative Multi-Layer Interaction," Software Engineering, 1996, Proceedings of the 18th International Conference, pp. 408-417.

4tops.com, "Excel Import Assistant for Microsoft Access," Apr. 2003, www.4tops.com.

ExcelTip.com, "Export data from Excel to Access (DAO) using VBA in Microsoft Excel" May 2003, pp. 1-2.

Andrew Witkowski et al., "Spreadsheets in RDBMS for OLAP," Jun. 2003, ACM SIGMOD, pp. 52-63.

U.S. Office Action dated Oct. 30, 2006 cited in U.S. Appl. No. 10/858,175.

U.S. Office Action dated Nov. 2, 2006 cited in U.S. Appl. No. 10/903,568.

U.S. Final Office Action dated May 4, 2007 cited in U.S. Appl. No. 10/903,568.

(56) References Cited

OTHER PUBLICATIONS

U.S. Final Office Action dated Sep. 24, 2007 cited in U.S. Appl. No. 10/858,175.
U.S. Office Action dated Dec. 19, 2007 cited in U.S. Appl. No. 10/903,568.
U.S. Final Office Action dated Jun. 6, 2008 cited in U.S. Appl. No. 10/903,568.
U.S. Final Office Action dated Nov. 14, 2008 cited in U.S. Appl. No. 10/858,175.
Chinese Second Office Action dated Nov. 21, 2008 cited in Chinese Application No. 200510082420.X.
U.S. Office action dated Dec. 19, 2008 cited in U.S. Appl. No. 10/903,568.
First Office Action dated Feb. 13, 2009, in Chinese Patent Application No. 200510082407.4.
Chinese Third Office Action dated Mar. 13, 2009 cited in Application No. 200510082420.X.
U.S. Office Action dated Apr. 3, 2009 cited in U.S. Appl. No. 10/858,175.
Mexican Office Action dated Jan. 22, 2009 cited in Application No. PA/a/2005/005799.
Chinese Fourth Office Action dated Jul. 10, 2009 cited in Application No. 200510082420.X.
European Official Communication dated Nov. 26, 2009 cited in EP Application No. 05 104 620.9-1243.
Australian Examiner's First Office Action dated Feb. 15, 2010 cited in Application No. 2005202285.
Russian Official Action dated May 15, 2009 cited in Application No. 2005116530/09(018863).
European Examination Report dated Mar. 1, 2007 cited in Application No. 05104477.4-2201.
Chinese First Office Action dated Mar. 14, 2008 cited in Application No. 200510082420.X.
Russian Office Action dated Dec. 23, 2009 cited in Application No. 2005116530/09(018863).
Mexican Office Action dated May 7, 21010 cited in Application No. PA/a/2005/005799.
Chinese Third Office Action dated May 12, 2010 cited in Application No. 200510082407.4.
Russian Decision on Grant dated Jun. 21, 2010 cited in Application No. 2005116530/09(018863).
Pershikov, V.I. et al., "Dictionary of Computer Science", Moscow, Finance and Statistics Publishers, 1991, p. 66, first column, 4 pp.
Person, R., Microsoft Excel 97 in the original St. Petersburg, BHV-St. Petersburg, 1997, vol. 1, pp. 15, 66, 249-253.
Rodnikov, D. I., "Formulas and Functions", section "The Concept Functions", http://revolution.allbest.ru/programming/00004026_0,html, St. Petersburg, 2003, 15 pp.
Karev, Ivan, "Portal Integration with ERP Systems: A SAP JavaConnector (JCo) Case Study", http://1vk.cs.msu.su/old/abstr/int-3.pdf, Moscow, 2003, 2 pp.
Australian Examination Report dated Jan. 13, 2010 cited in 2005202284.
Australian Second Examination Report dated Apr. 23, 2010 cited in 2005202284.
Australian Third Examination Report dated Sep. 3, 2010 cited in 2005202284.
European Search Report dated Jun. 28, 2006 cited in Application No. 05104661.3-2201.
European Examination Report dated Feb. 13, 2007 cited in Application No. 05104661.3-1527.
Chinese First Office Action dated Jan. 18, 2008 cited in Application No. 200510089652.8.
Chinese Second Office Action dated Jul. 4, 2008 cited in Application No. 200510089652.8.
Chinese Third Office Action dated Oct. 10, 2008 cited in Application No. 200510089652.8.
Chilean First Office Action dated late 2007-early 2008 cited in Application No. 1154-2005.
Chilean Second Office Action dated Aug. 2009 cited in Application No. 1154-2005.
Israeli Examination Report dated Aug. 3, 2009 cited in Application No. 168620.
Mexican Office Action dated Apr. 9, 2010 in Application No. Pa/a/2005/005856.
New Zealand Examination Report dated Jun. 7, 2005 cited in Application No. 540421.
New Zealand Second Examination Report dated Mar. 29, 2006 cited in Application No. 540421.
Philippine Examination Report dated Mar. 11, 2010 cited in Application No. 1-2005-00275.
Russian Office Action dated Jan. 18, 2010 cited in Application No. 2005116632/09(018975).
Russian Decision on Grant dated Jun. 10, 2010 cited in Application No. 2005116632/09(018975).
Singapore/Australian Search Report dated Aug. 28, 2006 cited in Application No. SG200503165-3.
Singapore/Australian Written Opinion dated Sep. 12, 2006 cited in Application No. SG200503165-3.
Singapore/Australian Second Written Opinion dated Apr. 20, 2007 cited in Application No. SG200503165-3.
Japanese Notice of Rejection dated Nov. 19, 2010 cited in Application No. 2005-161207.
John Walkenbach, Microsoft Excel 2000 Power Programming with VBA, "Interacting with Other Applications," Excerpt Chapter 19, 19 pgs., Apr. 27, 1999.
Crystal Ball 2000.2 User Manual, 414 pgs., Jun. 2001.
Mark Spencer, "Using Spreadsheets for Analysis and Reporting in Java-Based, Muti-Tier Web Applications," Tidestone Technologies, pp. 1-14, May 10, 2000.
Synthesis Manual, 234 pgs., 1999.
Dave Stearns, "Programming MS Office 2000 Web Components," Microsoft Press, 32 pgs., 1999.
Louis Gary Lamit, "Pro/Engineer® 2000i," 12 pgs., Aug. 10, 1999.
Louis Gary Lamit, "Pro/Engineer® 2000i$^2$ ," 13 pgs., Mar. 7, 2000.
Fabian Nunez, "An Extended Spreadsheet Paradign for Data Visualisation Systems, and its Implementation," Nov. 2000, pp. 1-144.
Danny Bradbury, "Understanding Digital Dashboard," PC Support Advisory, File: R1155.1, Aug. 2000, pp. 7-12.
Ultimus Version 5.0 Product Guide, Jun. 2001, pp. 1-54.
Torndiag.xls, 6 pgs., Oct. 1998, http://home.uchicago.edut~rmyerson.
Chris Kunicki et al., "Mircosoft® Office and the Web," Microsoft Tech.Ed 2000, 4-202, 20 pgs., Jun. 6, 2000.
Mike Ammerlaan, "Analysis and Reporting With Office Web Components," Microsoft Tech.Ed 2000, 26 pgs., Jun. 6, 2000.
David Shank et al., "Microsoft Office 2000 Visual Basic Programmer's Guide," Microsoft Press, 1999, 98 pgs.
John Walkenbach, "Microsoft Excel 2000 Formulas," 60 pgs., Oct. 15, 1999.
Laurent Longre, "Hidden Name Space in Excel", 1998, 6 pgs, http://www.cpearson.com/excel/hidd.
Dr. Raafat N. Ibrahim et al., "Development of Parametric Design Systems Using Functional Modelling Algorithm," pp. 329-335, Sep. 1999.
Scott E. Hudson, "User Interface Specification Using an Enhanced Spreadsheet Model," Georgia Institute of Technology, Jul. 1994, pp. 1-25.
Technical Guide, "Formula One™ for Java®," Robust development tool for Java developers and Webmasters, Version 7.0, Tidestone Technologies, Inc. 110 pgs., 1999.
Bill Fane, "Your Table is Waiting. . .", 1999, General OneFile, 3 pgs.
John Walkenbach, Microsoft® Excel 2000 Bible, Gold Edition, 2000, 86 pgs.
Eric Wells et al., "Microsoft ® Excel 97 Developer's Handbook," Microsoft Press, 1997, 14 pgs.
R.N. Ibrahim et al., "Design of Parametric Modelling Systems," pp. 1-12, 1999.
Frank A. Buytendijk, "The BI shockwave," Intelligent Enterprise, Nov. 16, 1999, pp. 42-48.

(56) References Cited

OTHER PUBLICATIONS

Blattner et al., Special Edition Using Microsoft Excel 2000, 1999, 1086 pgs.
Oracle® Discoverer™ 4i, Configuration Guide for Oracle9i Application Server, Release 4.1 for Windows NT, Part No. A87430-01, Dec. 2000, 168 pgs.
Oracle® Discoverer™ 4i, Configuration Guide for Oracle9i Application Server, Release 4.1 for UNIX, Part No. A87572-01, Dec. 2000, 156 pgs.
Chris Clack et al., "Object-Oriented Functional Spreadsheets," 12 pgs., Sep. 1997.
Tony Davie et al., Functional Hypersheets (Extended Abstract), Functional Programming, Glasgow, 1996, pp. 1-5.
Chris Clack et al., "Object-Oriented Functional Spreadsheets," 16 pgs., Sep. 1997.
Akihiko Matsumoto, "Feature: Solve difficult challenges—C/S, EPR, DW, Integrated data of Web, Part 2, Methods for total data integration seen in U.S.," Network Computing, RIC Telecom, Japan, Oct. 1, 1997, vol. 9, No. 10, pp. 27-31.
Japanese Notice of Rejection dated Feb. 15, 2011 cited in Application No. 2005-158658.
Korean Office Action dated Jun. 13, 2011 cited in 10-2005-45680.
Korean Office Action dated Jun. 16, 2011 cited in 10-2005-45672.
Japanese Notice of Rejection dated Oct. 4, 2011 cited in Application No. 2005-158659.
Korean Notice of Final Rejection dated Dec. 15, 2011 cited in Application No. 10-2005-0045680, 7 pgs.
Japanese Notice of Final Rejection dated Aug. 3, 2012 cited in Application No. 2005-158659, 4 pgs.

* cited by examiner

Black Scholes Option Pricing with Dividend

| Asset | Current Price | Exercise Price | Volatility (β) | Expiration (Yrs.) | Dividend | Call Value | Put Value |
|---|---|---|---|---|---|---|---|
| MSFT | $ 25.59 | $ 27.50 | 1.77% | 0.083333333 | 0.30% | $ 0.00 | $ 1.78 |
| C | $ 39.48 | $ 40.00 | 1.30% | 0.89 | 2.15% | | |
| INTC | $ 18.82 | $ 20.00 | 1.95% | 5.21 | 0.46% | | |
| SPY | $ 91.04 | $ 95.00 | 1.00% | 10 | 1.00% | | |

Calculations

| Asset | d1 | N(d1) | d2 | N(d2) | Div. (Yr) | Effective $ |
|---|---|---|---|---|---|---|
| MSFT | -13.1560122 | 7.85823E-40 | -13.161122 | 7.34443E-40 | $ 0.08 | $ 25.58 |
| C | 1.733093717 | 0.958460494 | 1.720829540 | 0.957359120 | $ 0.85 | $ 38.73 |
| INTC | 5.140745522 | 0.999999863 | 5.09623594 | 0.999999827 | $ 0.09 | $ 18.37 |
| SPY | 14.4807676 | 1 | 14.4491448 | 1 | $ 0.91 | $ 82.38 |

*Fig. 8.*

METHOD, SYSTEM, AND APPARATUS FOR PROVIDING ACCESS TO WORKBOOK MODELS THROUGH REMOTE FUNCTION CALLS

RELATED APPLICATIONS

This application is a Continuation of U.S. application Ser. No. 10/903,781 entitled "Method, System, and Apparatus for Providing Access to Workbook Models Through Remote Function Calls" filed Jul. 30, 2004, which issued on Nov. 5, 2013 as U.S. Pat. No. 8,578,399, which is incorporated herein by reference.

U.S. application Ser. No. 10/903,781 filed Jul. 30, 2004 is related to U.S. application Ser. No. 10/306,937 entitled "User-Defined Spreadsheet Functions" filed Nov. 26, 2002, which issued on Sep. 4, 2007 as U.S. Pat. No. 7,266,763, which is expressly incorporated herein by reference.

BACKGROUND OF THE INVENTION

Much of the utility of a spreadsheet application program lies in the ability of a user to capture data and algorithmic operations in an organized structure, such as a worksheet (also referred to herein at a "spreadsheet"), without the need for professional computer programming capabilities. A non-programmer user can specify complex data relationships, including summing operations, amortization operations, and so on, without learning a programming language. The non-programmer can utilize the capabilities of the spreadsheet application program in this manner to model complex numerical and financial relationships.

One of the problems with defining complex models within a spreadsheet application program is that the models are not encapsulated or labeled to support use by other users. In order to allow other users to access the model, it is typically necessary to employ the services of a programmer to code the model using a computer programming language. The compiled version of the model can then be published and utilized by other users. Coding a model in a programming language, however, requires the services of a skilled programmer and can therefore be very time consuming and expensive.

Alternatively, the workbook (a collection of worksheets or spreadsheets) containing the model may simply be shared with other users in a traditional manner, such as via a file share or through electronic mail. However, sharing a workbook containing a model in a traditional manner exposes the implementation of the model to each user that accesses the workbook. It may be desirable to hide the implementation of a model from the user, for instance, where the implementation of the model includes proprietary algorithms and calculations, but where it is still necessary to allow users to utilize the model. Current spreadsheet application programs do not provide a facility for allowing access to the model without permitting access to the underlying implementation.

It is with respect to these considerations and others that the various embodiments of the present invention have been made.

BRIEF SUMMARY OF THE INVENTION

In accordance with the present invention, the above and other problems are solved by a method, system, and apparatus for providing access to workbook models through remote function calls. Through the use of the embodiments of the invention, it is possible to share a workbook (a "workbook model" or "model") with other users without the need to code the model in a traditional programming language. Moreover, the workbook model is exposed for use without exposing the underlying implementation of the model.

According to one aspect of the invention, a system is provided for providing access to workbook models through remote function calls. According to one embodiment, the system includes a client computer capable of executing a spreadsheet application program for creating a workbook. The workbook may include one or more cells having data stored therein and may include application-provided or third-party pluggable functions used to define a model. Workbooks may also contain objects that bring data from external data sources (such as query tables or pivot tables) and may also contain calls to other workbook functions. Zero or more cells within the workbook may be defined as inputs to the model and one or more cells within the workbook may be defined as outputs from the model.

The spreadsheet application program may also be operative to receive a user request to make the workbook model available via one or more remote function calls. In response to such a request, the spreadsheet application program is operative to receive data from the user defining the new workbook function. In particular, the user may provide a name for the function and define the inputs, if any, and at least one output from the function. For instance, the user may identify the cells within the workbook that should be utilized as inputs to the function and provide a name for each input. Inputs may have default values and potentially be defined as optional (i.e. if they are not passed then the default is used). The user may also identify the cells within the workbook that should be utilized as outputs from the function and provide a name for each output. The user may also specify a server location at which the new workbook function should be published. Once the user has provided this data, the workbook and the data defining the function may be published to a server computer that is operative to receive and respond to remote function calls for the published workbook function.

The spreadsheet application program is further operative to call a remote workbook function from within the context of a workbook. The inputs to a remote function may be identified as cells within the workbook or parameters within a sub-formula. Once this information has been provided, the spreadsheet application program is operative to make a remote function call to the workbook function with the provided inputs. The remote function call may comprise a web services call made utilizing the simple object access protocol ("SOAP"). Other types of remote functions calls may also be utilized.

When a response is received at the spreadsheet application program from the remote function, the spreadsheet application program is further operative to receive the outputs from the function. The spreadsheet application program may place the outputs from the function into the cells within the workbook identified by the user for the function outputs or may utilize the outputs within a sub-formula. In this manner, a model may be defined within a workbook, published to a server computer, and called without exposing the underlying implementation of the model to the calling application.

According to aspects of the invention, the system also includes a server computer operative to execute a server program for receiving and responding to remote function calls directed toward workbook functions. In particular, the server computer is operative to receive and store workbooks and function definitions associated with the workbooks that define remote functions calls that may be made directed toward the workbook. The function definitions identify the name of the workbook function, a description of the parameters that should be used as inputs for the function, and a description of the parameters that should be used as outputs for the function. The server computer is also operative to expose the workbook functions so that the functions may be discovered by the clients that wish to make a remote call. Once the workbook functions have been exposed, client applications may discover and call the workbook functions through the use of remote function call.

When a call is received at the server computer for a workbook function, the server computer is operative to load the workbook. Once the workbook has been loaded, the server computer populates the cells in the workbook identified as inputs with input parameters received with the function call. If the workbook contains a reference to another data source, any data necessary to recalculate the workbook may be retrieved from the data source prior to the recalculation. References to other workbook functions may also be called. Once the workbook has been recalculated, the server computer is operative to retrieve from the workbook the contents of the cells defined as outputs for the function. The data contained in these cells is then returned as a reply to the remote function call. Any type of application that supports remote function calls may be utilized to call the workbook function on the server computer in this manner, including calls received from other server computers. It should be appreciated that a single computer may be utilized to perform the functionality of both the client and server computers as described herein.

The invention may be implemented as a computer process, a computing apparatus, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

BRIEF DESCRIPTION OF THE SEVERAL VIEWS OF THE DRAWINGS

FIG. 8 is a screen diagram illustrating the contents of a workbook following a call to a workbook function via a remote function call.

DETAILED DESCRIPTION OF THE INVENTION

Figure 1:
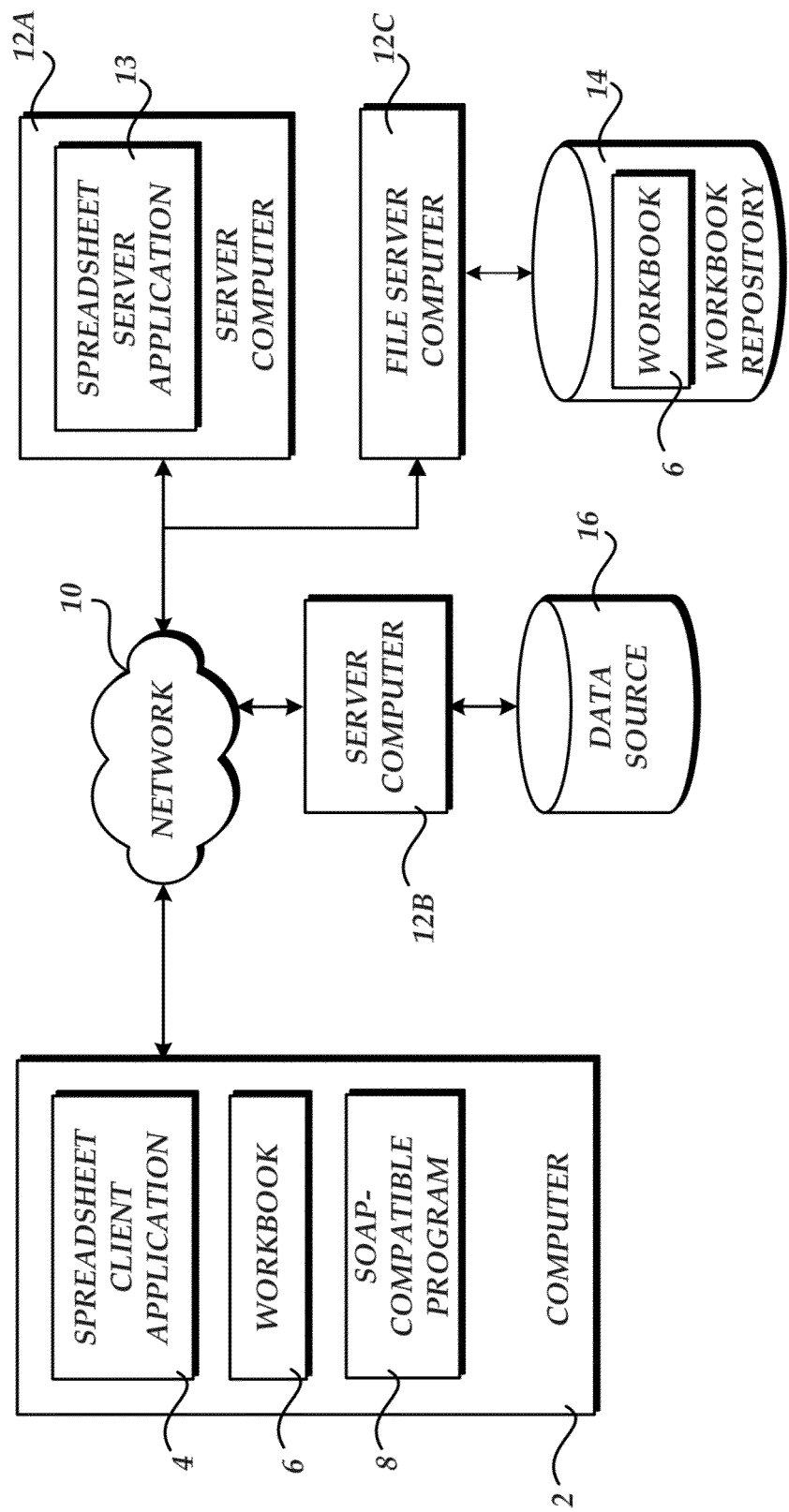
FIG. 1 is a computer network diagram illustrating aspects of several computer systems utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative operating environment for the several embodiments of the invention will be described. As shown in FIG. 1, a network 10 interconnects a client computer 2 and several server computers 12A-12C. It should be appreciated that the network 10 may comprise any type of computing network, including a local area network or a wide area network, such as the Internet. The network 10 provides a medium for enabling communication between the client computer 2, the server computers 12A-12C, and potentially other computer systems connected to or accessible through the network 10.

The client computer 2 comprises a general purpose desktop or laptop computer capable of executing one or more application programs. In particular, according to the various embodiments of the invention, the computer 2 is operative to execute a spreadsheet client application 4. As known to those skilled in the art, the spreadsheet client application program 4 provides functionality for creating budgets, performing financial forecasting, and other finance and numeric-related tasks. In order to provide this functionality, data values may be organized using cells and the relationships between the cells may be defined using formulas. A change to one cell produces changes to related cells. Spreadsheet programs usually provide graphing capabilities for output and a variety of formatting options for text, numeric values, and graph features.

According to embodiments of the invention, the spreadsheet client application 4 may be utilized to create a workbook 6. The workbook 6 is a file that is created by a spreadsheet program that contains one or more worksheets (a worksheet may also be referred to herein as a "spreadsheet").

A worksheet is a single page organized into rows and columns within the spreadsheet program and appearing on screen. Through the use of these features, a user can create models of financial and numerical problems and solutions. Additional details will be provided below as to how such workbook models may be published and then utilized through the use of remote function calls.

It should be appreciated that, according to one embodiment of the invention, the spreadsheet client application 4 comprises the EXCEL spreadsheet application program from MICROSOFT CORPORATION of Redmond, Wash. It should be appreciated, however, that the various aspects of the invention described herein may be utilized with other spreadsheet application programs from other manufacturers. Moreover, although the inventive aspects described herein are presented in the context of a spreadsheet application program, it should be appreciated that other types of application programs may also be utilized to embody the various aspects of the invention.

According to other embodiments of the invention, the client computer 2 may also be operative to execute a program 8 compatible with the simple object access protocol ("SOAP"). As will be described in greater detail below, workbook models may be published to the server computer 12A. The server computer 12A may then expose the workbook models to external callers through the use of remote function calls. For instance, through the use of web services, calls may be made to a workbook function exposing the workbook model. In one embodiment, the web service call may comprise a remote function call utilizing the SOAP protocol. The SOAP call may be made by the spreadsheet client application 4 or by the SOAP-compatible program 8. The SOAP-compatible program 8 may comprise any application or programming language capable of making a SOAP remote procedure call.

It should further be appreciated that in an alternative embodiment, the functions of the computer 2 described above may be divided among two computing devices. For instance, one computing device may be operative to execute the spreadsheet application 4 for publishing a workbook function while the other computing device may be operative to execute a client application, such as the SOAP-compatible program 8, for calling the workbook function. The client application may also be divided into one application that authors the workbook that calls the function and into another that actually performs the call. For example, the second one might be a server which runs the workbook that calls the workbook function.

The spreadsheet server application 13 comprises a server-based application program that may execute without the use of a display screen (headless). The spreadsheet server application 13 is operative to perform many of the functions of the spreadsheet client application 4 on a server computer. For instance, the spreadsheet server application 13 can load and calculate a workbook 6. As will be described herein, the spreadsheet server application 13 also provides functionality for receiving a workbook and data describing a workbook function. The spreadsheet server application 13 also exposes the workbook functions to outside callers and receives and responds to remote function calls. Additional details regarding the various functions performed by the spreadsheet client application 4 and the spreadsheet server application 13 will be provided below with respect to FIGS. 2-8.

Figure 2:
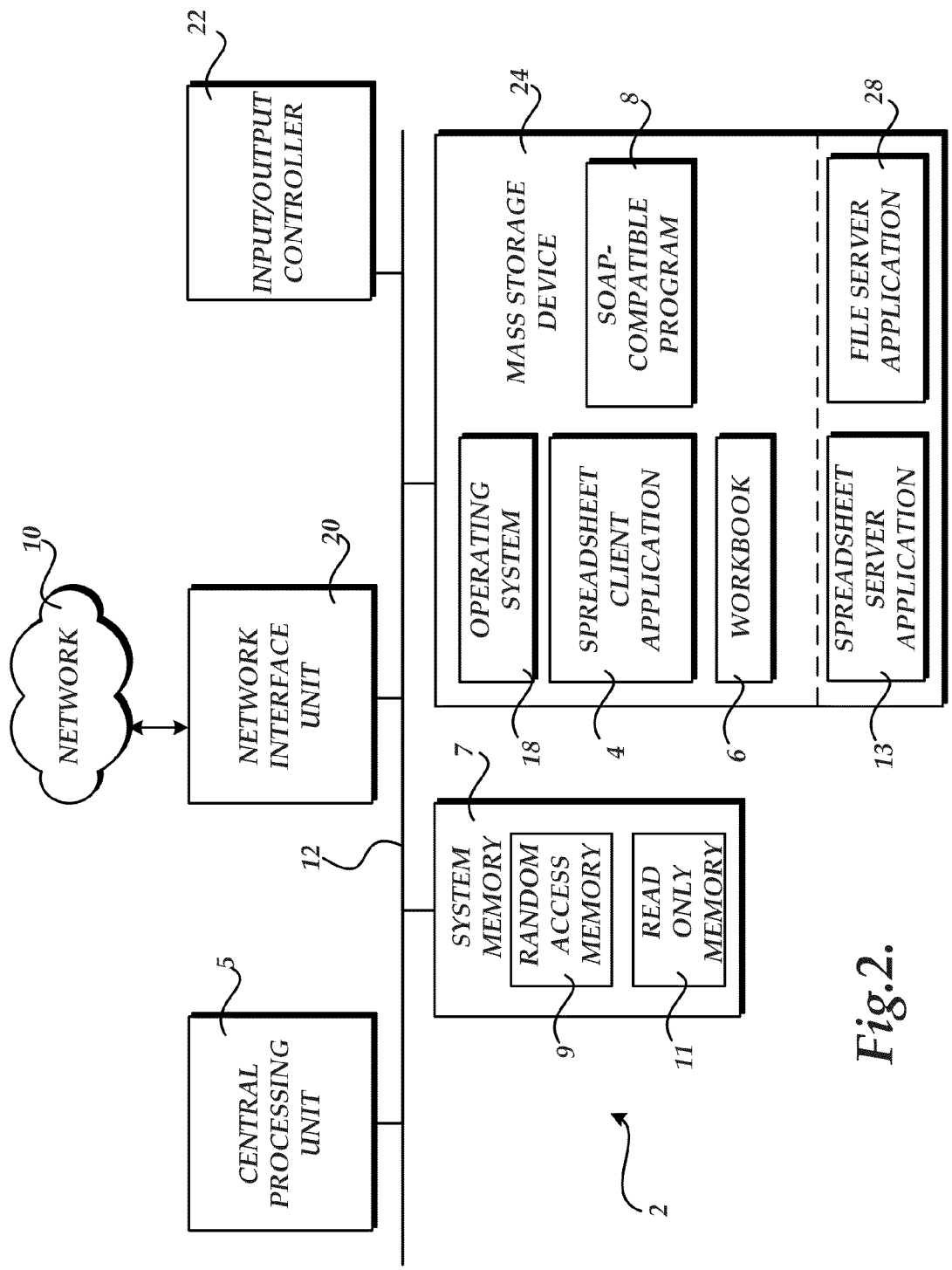
FIG. 2 is a computer system architecture diagram illustrating aspects of a client computer system utilized in and provided by the various embodiments of the invention.

Referring now to FIG. 2, an illustrative computer architecture for a computer 2 utilized in the various embodiments of the invention will be described. The computer architecture shown in FIG. 2 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 24 for storing an operating system 18, application programs, and other program modules, which will be described in greater detail below.

The mass storage device 24 is connected to the CPU 5 through a mass storage controller (not shown) connected to the bus 12. The mass storage device 24 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 10, such as the Internet. The computer 2 may connect to the network 10 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 2). Similarly, an input/output controller 22 may provide output to a display screen, a printer, or other type of output device.

As mentioned briefly above, a number of program modules and data files may be stored in the mass storage device 24 and RAM 9 of the computer 2, including an operating system 18 suitable for controlling the operation of a networked personal computer, such as the WINDOWS XP operating system from MICROSOFT CORPORATION of Redmond, Wash. The mass storage device 24 and RAM 9 may also store one or more program modules. In particular, the mass storage device 24 and the RAM 9 may store a spreadsheet client application 4 and a SOAP-compatible program 8, as described above. The mass storage device 24 and RAM 9 may also store a workbook 6 created by the spreadsheet client application 4.

It should be appreciated that the server computers 12A-12C may include many of the conventional computing components illustrated in FIG. 2 and described above. Additionally, the server computer 12A may be operative to store and execute a spreadsheet server application 13. The file server computer 12C may be operative to store and execute a file server application 28 for receiving and responding to requests for files stored in the repository 14, such as a workbook 6. It should be appreciated that the server computers 12A-12C may include other conventional components not illustrated in FIG. 2 but known to those skilled in the art.

Figure 3:
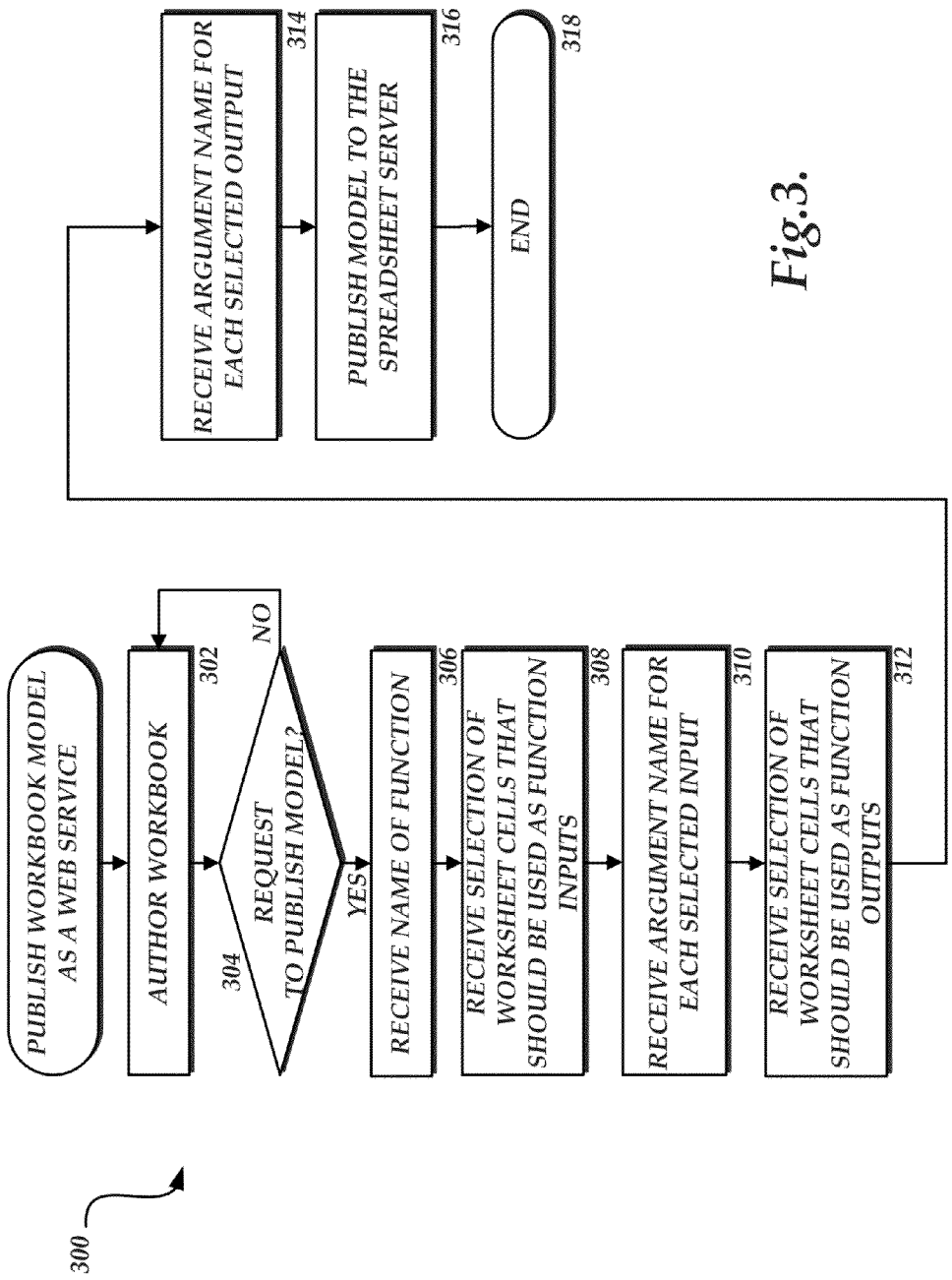
FIG. 3 is a flow diagram illustrating aspects of a process for publishing a workbook function to a server computer according to one embodiment of the invention.

Referring now to FIG. 3, an illustrative routine 300 will be described illustrating a process performed by the spreadsheet client application program 4 for publishing a workbook model to a server computer as a workbook function. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 3, 5, and 7, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 300 begins at operation 302, where a user utilizes the spreadsheet client application 4 to author the workbook 6. In particular, as described herein, the user may utilize the various facilities provided by the spreadsheet client application 4 to author a workbook containing a model. As defined herein, the term workbook model comprises a workbook authored in such a manner as to perform a numerical analysis and that includes one ore more cells that may be utilized as inputs for the model and one or more cells that provide the outputs from the model. The various functions and methodologies that may be utilized within a spreadsheet client application 4 to create a workbook model are virtually unlimited and well-known to those skilled in the art.

From operation 302, the routine 300 continues to operation 304, where the spreadsheet client application 4 determines whether a user has made a request to publish the workbook model to the server computer 12A as a workbook function. If the user has not made such a request, the routine 300 returns to operation 302 where the user may continue to author the model. If the user does request to publish the workbook model, the routine 300 continues to operation 306.

At operation 306, the spreadsheet client application 4 receives from the user a name for the workbook function. The name identifies the workbook which contains the function and the function itself within the workbook. The name may be utilized later by a calling application to identify the requested remote function call. Once the name has been received, the routine 300 continues to operation 308 where one or more cells may be identified by the user as the inputs to the function. At operation 310, the user may provide a text name for each of the inputs. For instance, a user may select a cell within the workbook to identify the cell as an input and then provide the name "Asset Price" to identify the input. Once the input cells and their names have been identified by the user, the routine 300 continues from operation 310 to operation 312.

At operation 312, one or more cells may be identified by the user as the outputs from the function. At operation 314, the user may provide a text name for each of the outputs. For instance, at operations 312 and 314, a user may select a cell within the workbook to identify the cell as an output and then provide the name "Call Value" to identify the output. Once the output cells and their names have been identified by the user, the routine 300 continues from operation 314 to operation 316.

From operation 314, the routine 300 continues to operation 316, where the workbook 6, including data defining the designated workbook function, is published to the spreadsheet server application 13. For instance, publication of the workbook 6 may include uploading the workbook 6 to the server computer 12A or programmatically generating a spreadsheet and sending it to the server computer 12A through a server application program interface ("API"). When the workbook 6 is published to the spreadsheet server application 13, the workbook 6 is stored in the repository 14. The spreadsheet server application 13 is also notified of the existence of the workbook 6 and the workbook functions defined within the workbook may then be exposed via web services. The data identifying the name of the workbook function and the input and output cells and their names is also published to the server 12A with the workbook.

Once the workbook 6 has been propagated to the repository 14 and analyzed by the spreadsheet server application 13, client applications, such as the SOAP-compatible program 8 or the spreadsheet client application 4, may be utilized to call the workbook function on the server computer 12A. Additional details regarding the various functions performed by the spreadsheet client application 4 to call the function and performed by the spreadsheet server application 13 in order to expose the workbook function and to receive and respond to function calls will be described in greater detail below with respect to FIGS. 5-8. From operation 316, the routine 300 continues to operation 318, where it ends.

Figure 4:
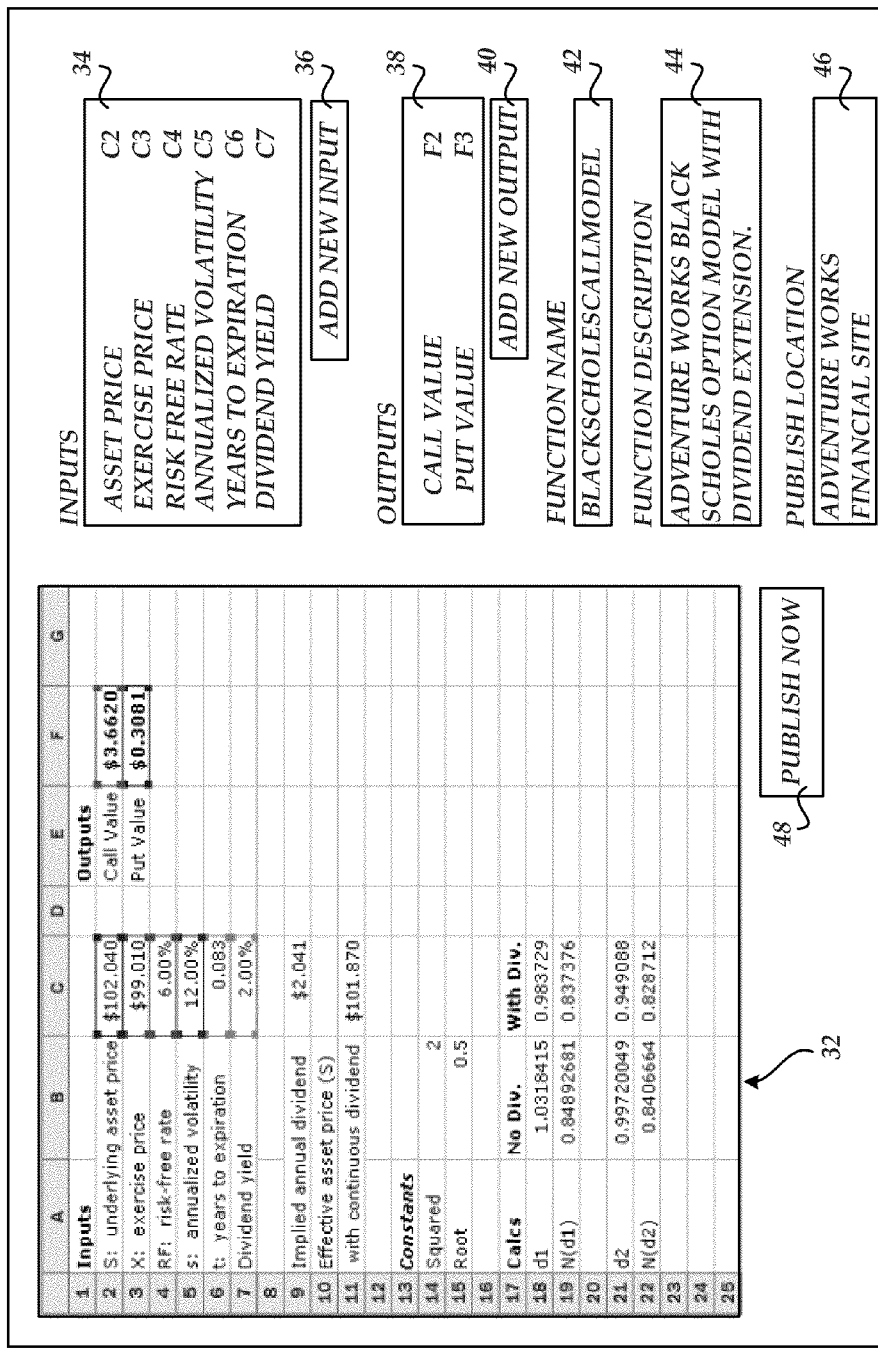
FIG. 4 is a screen diagram illustrating an aspect of the invention for providing a facility through which a user can define input and output cells for a workbook function according to one embodiment of the invention.

Referring now to FIG. 4, an illustrative user interface will be described for publishing a workbook model that includes a workbook function. The user interface 30 shown in FIG. 4 may be provided to a user in response to a user request to publish a workbook function to the server computer 12A. The user interface 30 may show a portion of the current worksheet 32. Each of the cells shown within the current worksheet 32 may be selected by the user to either identify the cell as an input to the function or as an output from the function.

In order to assist in the definition of the inputs to the workbook function, a user may select one or more cells within the current workbook 32. The user may then select the user interface button 36 to add the selected cell as a new input. The user may then enter a name for the input into the list box 34. In this manner, a user may define as many cells as necessary of the current workbook 32 as inputs to the workbook function. Similarly, the user may select one or more cells of the current workbook 32 and then select the user interface button 40 to designate the cells as outputs from the function. The list box 38 may then be utilized to provide a name for each of the input arguments. The example illustrated in FIG. 4 shows a workbook 32 that defines a model for calculating call and put values for options. The cells C2-C7 have been defined as inputs and cells F2-F3 have been defined as outputs.

The user interface 30 shown in FIG. 4 may also provide a text box 42 into which a name for the function may be typed by the user. The user may also provide a text description of the function in the text box 44. Finally, the user may identify the location at the server computer 12A at which the new workbook function should be published in the text box 46. Once the user has provided this information, the button 48 may be selected to publish the workbook, including the metadata describing the workbook function, to the server computer 12A.

Figure 5B:
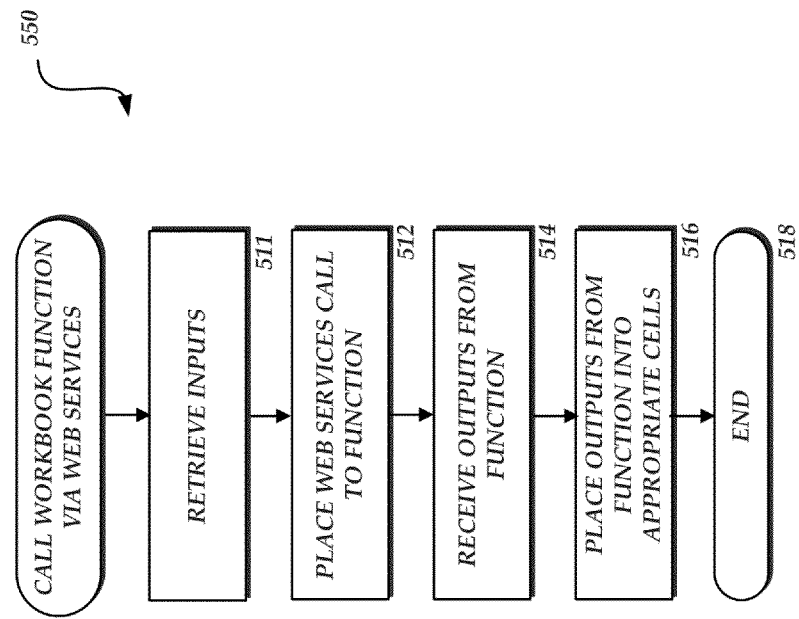
FIGS. 5A and 5B are flow diagrams illustrating aspects of processes for defining and calling a workbook function via web services according to one embodiment of the invention, respectively.
Figure 5A:
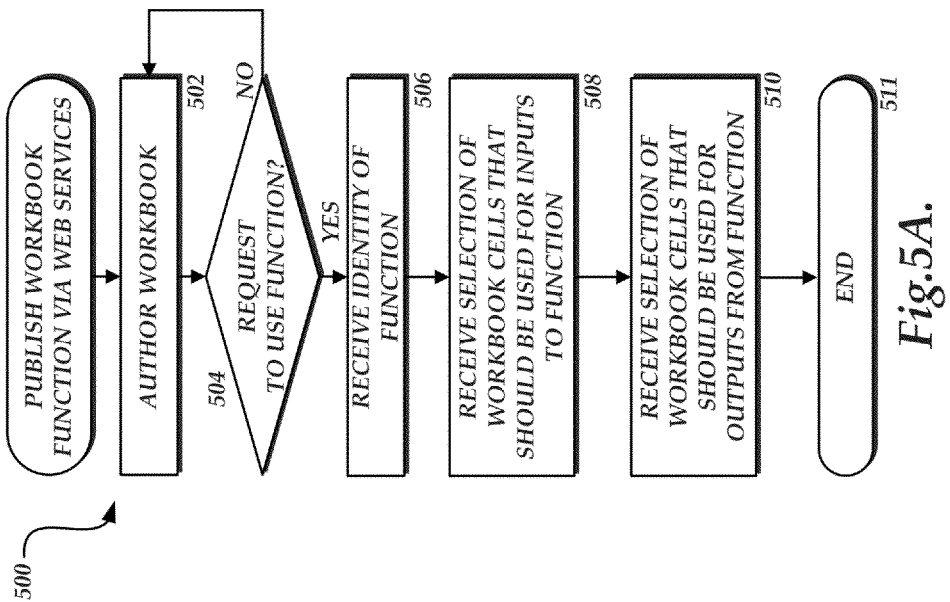

Turning now to FIG. 5A, an illustrative routine 500 will be described illustrating the operation of the spreadsheet client application 4 for defining and publishing a workbook function exposed by the server computer 12A. As discussed previously, it should be appreciated that the spreadsheet client application 4 is described herein as calling the workbook function. However, the workbook function may also be called by any other type of computer program that is compatible with remote function calls. For instance, other server computers, custom program code, other types of applications programs, and many other types of computer programs.

The routine 500 begins at operation 502, where a user utilizes the spreadsheet client application 4 to author a workbook in the manner described above. From operation 502, the routine 500 continues to operation 504, where the spreadsheet client application 4 determines whether a user has made a request to utilize a workbook function available from the server computer 12A. If the user has not made such a request, the routine 500 returns to operation 502 where the user may continue to author the model. If the user does request to utilize a remote workbook function, the routine 500 continues to operation 506.

At operation 506, the name of the requested function is received from the user. A list of available workbook functions and their parameters may be discovered and retrieved from the server computer 12A. Once the user has identified the remote workbook function to be utilized, the routine 500 continues to operation 508, where the user selects the workbook cells that should be utilized as inputs to the workbook function. In particular, the user assigns one cell to each of the inputs of the function. The data in the assigned cells may then be provided as inputs to the function when the remote function call is made. At operation 510, the user selects the workbook cells where outputs from the function should be placed in a similar manner. The routine 500 then continues to operation 511, where it ends.

Turning now to FIG. 5B, an illustrative routine 550 will be described for calling a workbook function via a web services call. The routine 550 begins at operation 511, where data from the input cells along with the respective names of the input parameters for the function call are retrieved. At operation 512, the web-services call is placed to the requested function. At operation 514, the spreadsheet client application 4 receives a response from the server computer 12A including the outputs from the function call. At operation 516, the received outputs are placed into the workbook at the cell locations defined by the user for outputs. FIG. 8 shows a portion of the workbook 70. As described above, the cells 72 and 74 were defined as containing the outputs from the workbook function. As shown in FIG. 8, the values calculated by the workbook function that were returned to the spreadsheet client application 4 have been placed into the appropriate cells of the workbook 70. From operation 516, the routine 550 continues to operation 518, where it ends.

Figure 6:
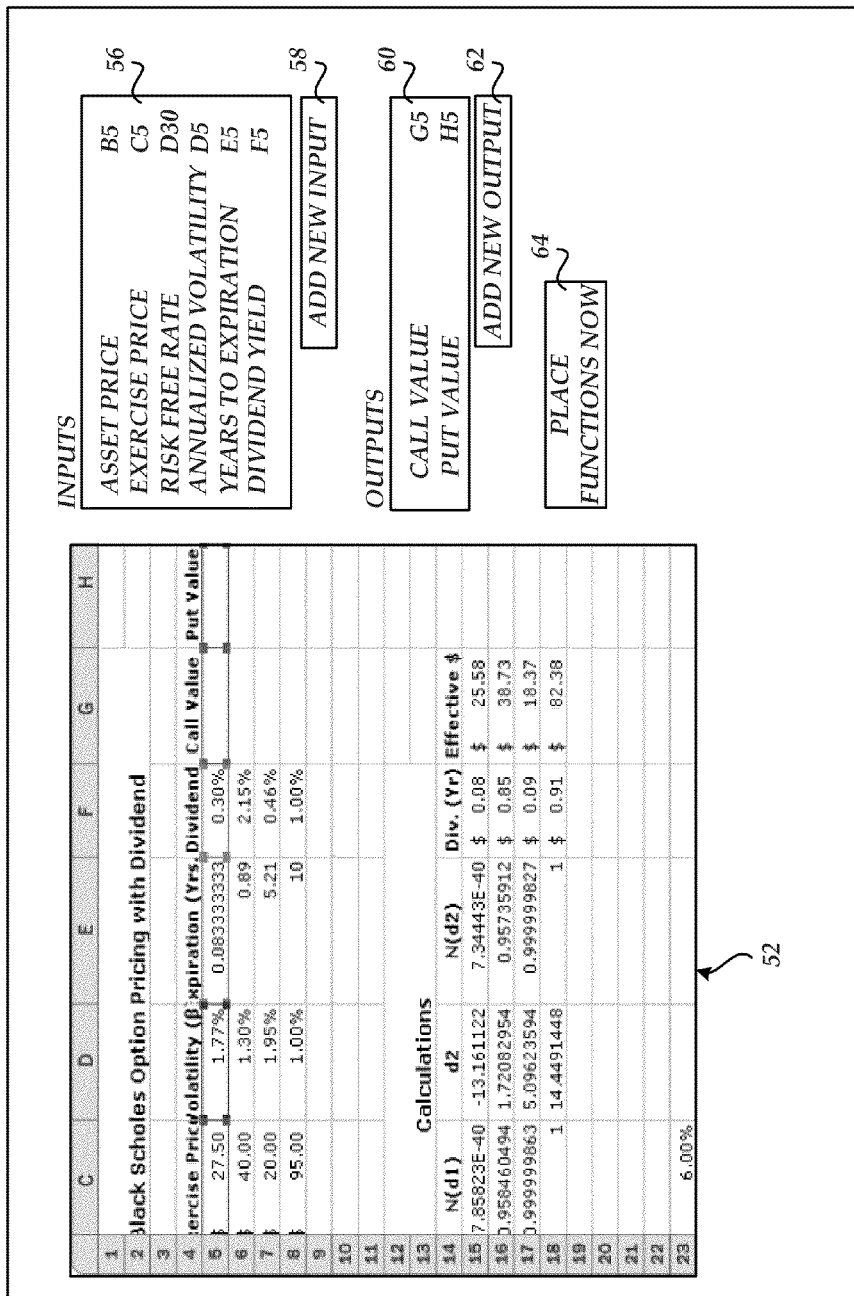
FIG. 6 is a screen diagram illustrating an aspect of the invention for providing a facility through which a user can define the cells to be utilized as inputs and outputs when calling a workbook function via a remote function call.

Referring now to FIG. 6, an illustrative user interface will be described for generating a remote function call to a server-hosted workbook function. The user interface 50 shown in FIG. 6 is displayed by the spreadsheet client application 4 in response to a request by a user to utilize a remote workbook function. The user interface 50 includes a display of the current workbook 52, including one or more cells of the workbook.

The user interface 50 also includes a list box 56 that identifies each of the inputs to the requested workbook function. The user may select any of the cells of the workbook 52 and then select the button 58 to assign the cell to an input of the function. Similarly, the list box 68 identifies by name each of the outputs of the function. The user may select any of the cells of the workbook 52 and the button 62 to assign cells of the workbook to the outputs of the function. Once the user has assigned cells of the workbook 52 to each of the inputs and outputs, the user may select the user interface button 64 to place the desired remote function call.

Figure 7:
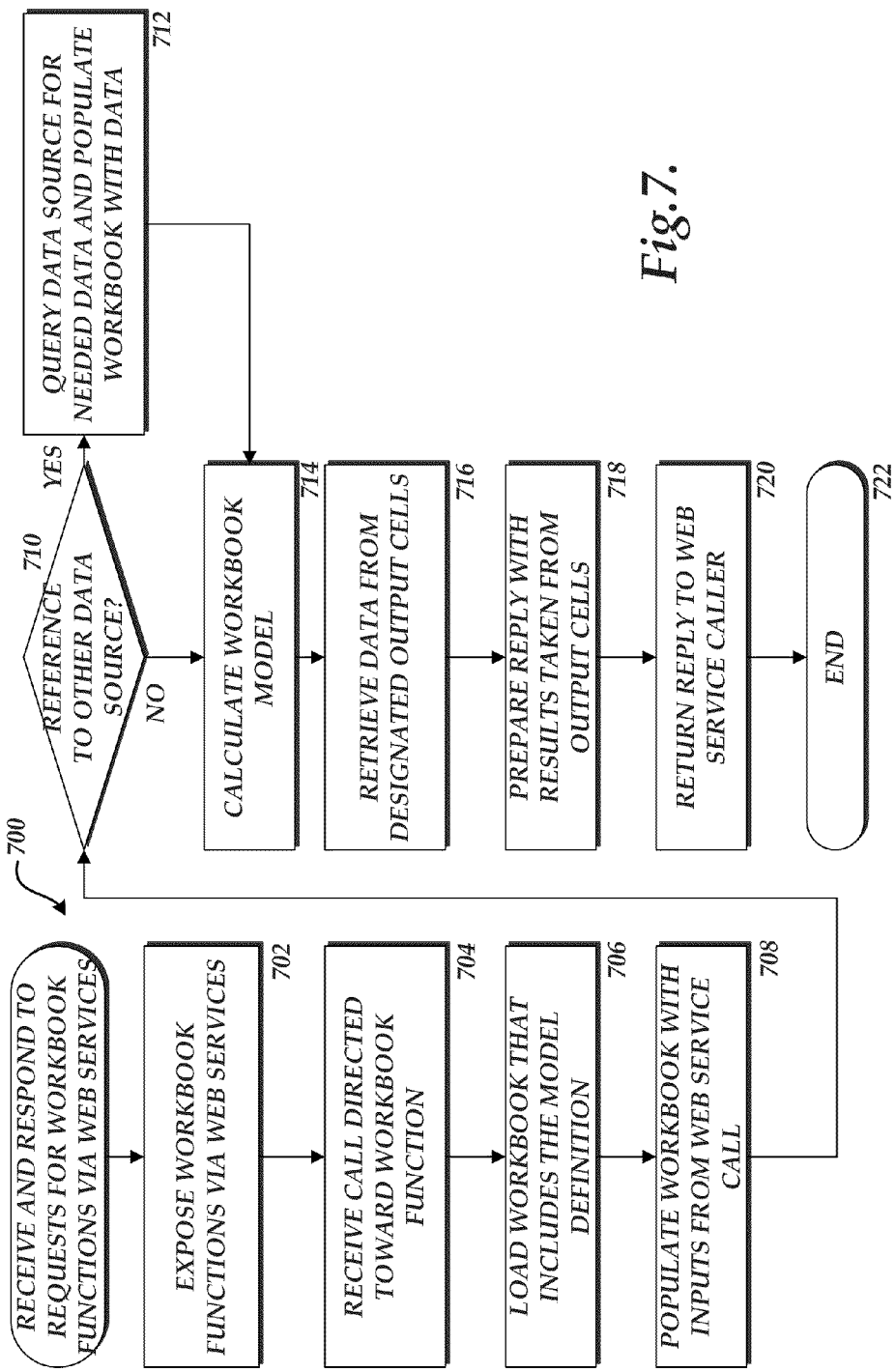
FIG. 7 is a flow diagram illustrating the steps performed by a server computer when receiving and responding to remote function calls for workbook models according to one embodiment of the invention.

Turning now to FIG. 7, an illustrative routine 700 will be described illustrating the operation of the spreadsheet server application 13 for receiving and responding to calls directed toward a workbook function exposed via web services. The routine 700 begins at operation 702, where the spreadsheet server application 13 exposes the available workbook functions. Once the spreadsheet server application 13 has exposed the various workbook functions, a client application such as the SOAP-compatible program 8 or the spreadsheet client application 4 may discover the available functions and issue calls directed to a specific function.

The routine 700 continues from operation 702 to operation 704, where the spreadsheet server application 13 receives a remote function call directed toward a specific workbook function. The call includes data identifying each of the inputs to the function and providing values for each of the inputs. From operation 704, the routine 700 continues to operation 706, where the spreadsheet server application 13 loads the workbook 6 containing the workbook function to which the received call was directed. Once the workbook 6 has been loaded by the spreadsheet server application 13, the routine 700 continues to operation 708, where the spreadsheet server application 13 populates the appropriate cells of the loaded workbook with the inputs provided with the web services call. The routine 700 then continues from operation 708 to operation 710.

At operation 710, the spreadsheet server application 13 determines whether the workbook 6 includes a reference to another data source or another workbook function. For instance, as described briefly above, the workbook may include a reference to a data source, such as the data source 16. If the workbook 6 includes a reference to another data source, the routine 700 branches to operation 712, where the spreadsheet server application 13 queries the data source 16 for any data needed to calculate the workbook 6. Once this data is received by the spreadsheet server application 13, the workbook 6 is updated with the received data.

If, at operation 710, it is determined that the workbook 6 does not include a reference to another data source, the routine 700 continues to operation 714. At operation 714, the spreadsheet server application 13 recalculates the contents of the workbook 6, including calculation of the workbook function. From operation 714, the routine 500 continues to operation 716, where the spreadsheet server application 13 retrieves the contents of cells of the workbook model that were identified as outputs when the workbook function was defined. The routine 700 then continues to operation 718, where the spreadsheet server application 13 prepares a web services reply that includes the data from the outputs of the workbook function. At operation 720, the reply is transmitted to the client computer 2 as a response to the initial web services request. The client computer 2 may then place the received output data into the appropriate cells in the manner described above. The routine 700 then continues from operation 720 to operation 722, where it ends.

Based on the foregoing, it should be appreciated that the various embodiments of the invention include a method, system, apparatus, and computer-readable medium for exposing and calling workbook functions via web services. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for providing remotely accessible workbook models, the method comprising:
determining whether a user has made a first request to publish the workbook models;
in response to determining that the user made the first request:
storing a definition of a workbook model, the workbook model being associated with a workbook function for remotely exposing the workbook model;
storing a definition of the workbook function, wherein storing the definition of the workbook function comprises providing a plurality of input fields for defining the workbook function, the plurality of input fields comprising:
a first input field for defining a first set of parameters to be used as inputs to the workbook function, the first set of parameters being associated with a first set of workbook cells of the workbook model, and
a second field for defining a second set of parameters to be used as outputs of the workbook function, the second set of parameters being associated with a second set of workbook cells of the workbook model;
publishing the workbook model to a server computer operative to receive;
determining whether a user has made a second request to utilize the workbook function;
in response to determining that the user made the second request:
respond to remote calls for the workbook function, wherein publishing the workbook model comprises notifying a spreadsheet server application on the server computer that the workbook model and the workbook function have published to the server computer;
populating the first set of workbook cells in the workbook model with inputs received during a remote function call for the workbook function, the received inputs comprising a third set of workbook cells in a local workbook designated as the inputs to the remote function call;
recalculating the workbook function;
retrieving the second set of parameters from the second set of workbook cells; and
returning the retrieved second set of parameters to a fourth set of cells in the local workbook, the fourth set of cells being designated as outputs for the remote function call.

2. The method of claim 1, further comprising receiving a request to make the workbook model available through a remote function call.

3. The method of claim 1, further comprising associating metadata with the workbook function, the metadata comprising a description of the workbook function.

4. The method of claim 3, further comprising publishing the workbook model to the server computer with the description.

5. The method of claim 1, further comprising placing a remote function call to the server computer with a first set of information associated with the first set of parameters.

6. The method of claim 5, further comprising receiving from the server computer a second set of information associated with the second set of parameters.

7. The method of claim 5, wherein placing the remote function call to the server computer comprises placing the remote function call to the server computer through a web services call.

8. The method of claim 7, placing the remote function call to the server computer through the web services call comprises utilizing a simple object access protocol (SOAP).

9. A computer-readable medium that is not carrier wave and having a set of instructions which when executed performs a method for providing remotely accessible workbook models, the method executed by the set of instructions comprising:
determining whether a user has made a first request to utilize the workbook function;
in response to determining that the user made the first request,
receiving the first request to call a remote workbook function from within a context of a workbook;
receiving the following:
an identity of the remote workbook function to be called,
an identity of at least one first cell in the workbook to be used as at least one input to the remote workbook function,
an identity of at least one second cell in the workbook where at least one output from the remote workbook function is placed, and
a location of a server to which the remote workbook function is published, wherein the workbook is stored in the server in response to a determined user second request;
making a remote function call to the remote workbook function, wherein making the remote function call to the remote workbook function comprises providing a first set of parameters from the at least one cell to populate a first set of workbook cells of a workbook model comprising the remote workbook function, the first set of workbook cells of the workbook model being designated as inputs to the remote workbook function;
in response to the remote function call, receiving the at least one output from the remote workbook function, wherein receiving the at least one output comprises retrieving a second set of parameters from a second set of workbook cells of the workbook model, the second set of cells of the workbook model being designated as outputs of the remote workbook function, wherein receiving the at least one output further comprises receiving the at least output in response to recalculating the remote workbook function based on the at least one input; and
placing the at least one output received from the remote workbook function in the at least one second cell where the at least one output from the remote workbook function is placed.

10. The computer-readable medium of claim 9, further comprising, making a discovery request to receive a listing of available function calls.

11. The computer-readable medium of claim 10, further comprising, in response to the discovery request, receiving a list of published functions.

12. The computer-readable medium of claim 11, wherein receiving the list of published functions comprises receiving descriptions associated with each published function.

13. The computer-readable medium of claim 12, wherein receiving the descriptions associated with each published function comprises receiving the descriptions based on metadata associated with each published function.

14. The computer-readable medium of claim 9, further comprising:
   determining whether the workbook includes a reference to an external data source; and
   in response to determining that the workbook includes the reference to the external data source:
      querying the external data source for any referenced data, and
      populating the workbook with the external data.

15. The compute-readable medium of claim 9, wherein making the remote function call to the remote workbook function comprising the at least one input comprises making a web services call.

16. The computer-readable medium of claim 15, wherein making the web services call comprises utilizing a simple object access protocol (SOAP).

17. A system for providing remotely accessible workbook models, the system comprising:
   a client computer comprising a first memory storage and a first processing unit, wherein the client computer is operative to:
   determine whether a user has made a first request to publish the workbook models;
   in response to determining that the user made the first request:
      store a definition of a workbook,
      store a definition of a workbook function associated with the workbook, wherein the definition of the workbook function comprises a first input field for defining a first set of parameters to be used as inputs to the workbook function, the first set of parameters being associated with a first set of workbook cells of the workbook, and a second field for defining a second set of parameters to be used as outputs of the workbook function, the second set of parameters being associated with a second set of workbook cells of the workbook,
      publish the workbook and the workbook function to a server computer operative to receive and respond to remote calls for the workbook function,
      notify a spreadsheet server application on the server computer that the workbook and the workbook function have been published to the server computer; and
   the server computer comprising a second memory storage and a second processing unit, wherein the server computer is operative to:
      receive the workbook and the workbook function from the client computer,
      determine whether a user has made a second request to utilize the workbook function,
      in response to determining that the user made the second request:
         receive a remote function call for the workbook function, the remote function call comprising at least one input parameter as inputs for the workbook function,
         the at least one parameter defined as a third set of workbook cells in a local workbook associated with the remote function call,
         populate at least one of the first set of workbook cells of the workbook specified as the inputs to the workbook function with the at least one input parameter received in the remote function call for the workbook function,
         calculate the workbook, retrieve contents of at least one of the second set of workbook cells specified by the workbook function as at least one output for the function, and
         return the contents of the at least one second cell to a fourth set of workbook cells designated as output cells in the local workbook as a reply to the remote function call.

18. The system of claim 17, wherein a workbook function definition for the workbook function comprises:
   a name for the workbook function,
   an identity of the at least one first cell that is utilized as at least one input to the workbook function, and
   an identity of the at least one second cell that is utilized as at least one output for the workbook function.

19. The system of claim 17, wherein prior to calculating the workbook, the server computer is further operative to:
   determine whether the workbook includes a reference to an external data source; and
   in response to determining that the workbook includes the reference to the external data source:
      query the external data source for any referenced data, and
      populate the workbook with the external data.

* * * * *